United States Patent
Hawkes et al.

(10) Patent No.: US 10,674,358 B2
(45) Date of Patent: Jun. 2, 2020

(54) REPRESENTING UNIQUE DEVICE IDENTIFIERS IN HIERARCHICAL DEVICE CERTIFICATES AS FULLY QUALIFIED DOMAIN NAMES (FQDN)

(71) Applicant: QUALCOMM Incorporated, San Diego, CA (US)

(72) Inventors: Philip Michael Hawkes, Sydney (AU); Anand Palanigounder, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 273 days.

(21) Appl. No.: 15/483,808

(22) Filed: Apr. 10, 2017

(65) Prior Publication Data

US 2018/0295506 A1 Oct. 11, 2018

(51) Int. Cl.
*H04W 12/06* (2009.01)
*H04L 29/06* (2006.01)
(Continued)

(52) U.S. Cl.
CPC ............ *H04W 12/06* (2013.01); *G06F 21/44* (2013.01); *H04L 9/3265* (2013.01);
(Continued)

(58) Field of Classification Search
CPC ............ G06F 21/44; H04L 9/006–007; H04L 9/3247–3257; H04L 9/3263–3268;
(Continued)

(56) References Cited

U.S. PATENT DOCUMENTS

2011/0246646 A1* 10/2011 Nakhjiri ............ H04L 63/0823
709/224
2015/0271122 A1* 9/2015 Jalisatgi ................ H04L 51/18
713/158

FOREIGN PATENT DOCUMENTS

WO 2005033868 A2 4/2005
WO 2010102259 A2 9/2010

OTHER PUBLICATIONS

International Search Report and Written Opinion—PCT/US2018/018828—ISA/EPO—dated Apr. 23, 2018).
(Continued)

*Primary Examiner* — Kevin Bechtel
(74) *Attorney, Agent, or Firm* — Loza & Loza, LLP

(57) ABSTRACT

Methods and devices are provided for generating, delegating, and/or authenticating hierarchical globally unique identifier (HGUID) certificates that are arranged in domain-name form to permit delegation and authentication as a Fully Qualified Domain Name (FQDN). A first hierarchical device certificate is obtained that includes at least part of a first unique device identifier for a first device and a base domain name, wherein the first hierarchical device certificate includes a fully qualified domain name and the first unique device identifier includes at least one of a type/model identifier or an origin/manufacturer of the first device. The first hierarchical device certificate is sent to an authenticating device to prove the first device has authority to perform a transaction within a restricted domain as defined by the first hierarchical device certificate. An indication may then be received from the authenticating device that the first device has been authenticated to perform the transaction.

18 Claims, 11 Drawing Sheets

Exemplary Method Operational By Root Certificate Node/Device To Generate and Distribute Hierarchical Device Certificates

(51) Int. Cl.
*G06F 21/44* (2013.01)
*H04L 9/32* (2006.01)
*H04W 12/00* (2009.01)

(52) U.S. Cl.
CPC ...... *H04L 63/0823* (2013.01); *H04L 63/0876* (2013.01); *H04W 12/00512* (2019.01)

(58) Field of Classification Search
CPC .......... H04L 63/0823; H04L 63/0876; H04W 12/06; H04W 12/0609
See application file for complete search history.

(56) References Cited

OTHER PUBLICATIONS

Qualcomm Europe, et al., "pCR to TS 33.320: Certificate Revocation Checking and H(e)NB Authorization", 3GPP Draft; S3-092137 PCR TS33320 Cert Check and Auth, 3rd Generation Partnership Project (3GPP), Mobile Competence Centre; 658, Route Des Lucioles; F-86921 Sophia-Antipolis Cedex; France, No. Dublin; Nov. 16, 2009, Nov. 16, 2009 (Nov. 16, 2009), pp. 1-8, XP050398623, [retrieved on Nov. 12, 2009].

* cited by examiner

FIG. 2  EXEMPLARY CERTIFICATE DELEGATION

EXEMPLARY CERTIFICATE GENERATION, DELEGATION, AND AUTHENTICATION

FIG. 5    EXEMPLARY CERTIFICATE DELEGATION

*Exemplary Fully Qualified Domain Name Structure for EUI-64 Certificates*

FIG. 7    EXEMPLARY CERTIFICATE DELEGATION

*Exemplary Method Operational By An Authentication/ Validation Node/Device To Authenticate/Validate Hierarchical Device Certificates*

REPRESENTING UNIQUE DEVICE IDENTIFIERS IN HIERARCHICAL DEVICE CERTIFICATES AS FULLY QUALIFIED DOMAIN NAMES (FQDN)

BACKGROUND

Field

One or more features relate to generating a hierarchical certificate (e.g., for a certificate authority and/or device) that integrates a unique device identifier (e.g., a hierarchical, globally unique device identifier) in a domain name-type structure.

Background

Electronic devices are often assigned a hierarchical globally unique identifier (HGUID) composed of multiple identifiers assigned by a sequence of one or more hierarchical domains associated with organizations or companies. One identifier may be, for example, a serial number or similar device identifier assigned within a least significant domain, while other identifiers may be assigned to organizations or companies in a hierarchical fashion. Typically, the domain identifiers are presented from left to right in the order of hierarchy with most significant domain listed first, followed by the serial number or similar identifier provided as the right-most identifier. The HGUID can include additional separation characters, such as '−', to enhance readability. Examples include International Mobile Equipment Identifiers (IMEI), and IMEI Software version (IMEISV) and IEEE-defined 64-bit Extended Unique Identifier (EUI-64™). It is desirable to issue device certificates including a globally unique identifier, which can be validated by use of a trusted Root Certificate Authority (CA) certificate.

The IMEI and IMEISV are usually represented using decimal digits. For instance, the IMEI/IMEISV may be structured with an initial 8-digit Type Allocation Code (TAC) identifying the model and origin (e.g., of the client device or communication chip/modem), a 6-digit serial number (e.g., for the client device or communication chip/modem), and either a check digit (for the IMEI) or a two-digit version number (for IMEISV).

The Global System for Mobile communication Association (GSMA) manages the registries which issue TACs to vendors. The TAC itself is structured, with the first two digits representing the Reporting Body Identifier (RBI) which identifies the GSMA-approved group that allocated the TAC. The TAC may be represented as RBI|TACX (with "|" denoting a concatenation operation).

The EUI-64 may be formed in one of three specified ways. A MAC (media access control) Address Block Large (MA-L) assignment is a concatenation of a 24-bit Organizationally Unique Identifier (OUI) value assigned by the Institute of Electrical and Electronics Engineers (IEEE) Registration Authority (IEEE RA) and a 40 bit extension identifier assigned by the organization with that OUI assignment. A MA-S (MAC Address Block Small) assignment is a concatenation of a 36-bit OUI-36 value assigned by the IEEE Registration Authority (RA) and a 28-bit extension identifier assigned by the organization with that OUI-36 assignment. EUI-64 also supports an MA-M (MAC Address Block Medium) assignment which is completely managed by the IEEE RA.

It is desirable to issue device certificates including a HGUID, which can be validated by use of a trusted Root Certificate Authority (CA) certificate.

The term IMEI certificates may be used to denote device HGUID certificates containing an IMEI identifier or IMEISV identifier. In some cases, the Root CA may issue the device certificate directly, while in other cases the Root CA delegates, via a CA Certificate issued to an intermediate CA, permission to issue the device HGUID certificates. The Intermediate CA may also wish to further delegate permission via additional CA Certificates. In the case of delegation, the first CA may wish to provide the second CA with authority to issue device HGUID certificates only for HGUIDs in a particular domain. This is particularly the case when a malicious device manufacturer acts as the second CA, and may wish to have their device HGUID certificates use incorrect HGUIDs assigned to other device manufacturers. For example, a low-end device manufacturer may wish for their devices to have device HGUID certificates with HGUIDs corresponding to high-end devices. The term HGUID CA certificates may be used to denote a CA certificate providing a CA with authority to issue device HGUID certificates only for HGUIDs in a particular domain.

The entities validating the device certificates may be configured to trust the Root CA for a certain set of IMEI: typically either (a) all IMEIs, (b) IMEIs starting with a specified RBI values (e.g., IMEIs managed by a specific Reporting Bodies), and/or (c) IMEIs starting with a specific set of TAC values. The terms device HGUID certificates and hierarchical device certificates may be interchangeably used to denote such device certificates.

In one example, the term EUI-64 certificates may be used to denote device HGUID certificates containing a EUI-64. The entities validating the EUI-64 certificates may be configured to trust the Root CA for a certain set of EUI-64: typically either (a) all EUI-64, and/or (b) EUI-64 MA-L and MA-S assignments starting with a specified OUI values (e.g., EUI-64 managed by a specific organization). Like the delegation of device certificates, the Root CA may also delegate the issuance of some OIU values to a second CA.

Consequently, a solution is needed to allow a Root CA with authority to issue device HGUID certificates for only a specific set of HGUID values (e.g. with specific RBI values and/or TAC values or OUI values). Additionally, a solution is also needed that permits a first CA to issue HGUID CA Certificates which provide a second CA with authority to issue certificates for only a specific set of HGUID values (e.g. with specific RBI values and/or TAC values and/or OUI values), within a scope of authority of the first CA. Therefore, a way is also needed that permits the Root CA or intermediate CAs to delegate authority to issue HGUID certificates (e.g., in a specific subset of a HGUID value space within a scope of authority of the issuing Root CA or first CA).

SUMMARY

A first aspect provides a method operational at a first device for generating and utilizing hierarchical globally unique identifier (HGUID) certificates including a name arranged in domain-name form to permit delegation and authentication as a Fully Qualified Domain Name (FQDN). A first hierarchical device certificate may be obtained that includes at least part of a first unique device identifier for a first device and a base domain name, wherein the first hierarchical device certificate is a fully qualified domain name and the first unique device identifier includes at least one of a type/model identifier or an origin/manufacturer of the first device. The first hierarchical device certificate may be sent to an authenticating device to prove the first device has authority to perform a transaction within a restricted domain as defined by the first hierarchical device certificate. An indication may be received from the authenticating device that the first device has been authenticated to perform the transaction.

The at least part of the first unique device identifier is may be segmented into sub-domains that define the restricted domain in which the first device is permitted to operate.

In one example, the first unique device identifier may include an identifier of a Global System for Mobile communication Association (GSMA) approved group that allocates a type allocation code. In another example, the first unique device identifier may include an IEEE 64-bit Extended Unique Identifier.

Additionally, a second hierarchical device certificate may be generated that combines at least part of the first unique device identifier or a second unique device identifier associated with a second device, and the first hierarchical device certificate, wherein the second hierarchical device certificate includes a fully qualified domain name. The second hierarchical device certificate and second device information may be sent to the second device to allow it to prove it has authority to perform a transaction within a restricted domain as defined by the second hierarchical device certificate. In some implementations, the second hierarchical device certificate and second device information may be sent to an authenticating device to allow it to authenticate/validate that the second device has authority to perform a transaction within the base domain name.

Another aspect provides a first device comprising a communication circuit and a processing circuit. The processing circuit may be configured to: (a) obtain a first hierarchical device certificate that includes at least part of a first unique device identifier for the first device and a base domain name, wherein the first hierarchical device certificate includes a fully qualified domain name and the first unique device identifier includes at least one of a type/model identifier or an origin/manufacturer of the first device; (b) send the first hierarchical device certificate to an authenticating device to prove the first device has authority to perform a transaction within a restricted domain as defined by the first hierarchical device certificate; (c) receive an indication from the authenticating device that the first device has been authenticated to perform the transaction, (d) generate a second hierarchical device certificate that combines at least part of the first unique device identifier or a second unique device identifier associated with a second device, and the first hierarchical device certificate, wherein the second hierarchical device certificate includes a fully qualified domain name; (e) send the second hierarchical device certificate and second device information to the second device to allow it to prove it has authority to perform a to perform a transaction within a restricted domain as defined by the second hierarchical device certificate; and/or (f) send the second hierarchical device certificate and second device information to an authenticating device to allow it to authenticate/validate that the second device has authority to perform a transaction within the base domain name.

Yet another aspect provides a method for validating device certificates at a node. As part of a transaction, a first hierarchical device certificate may be received from a first device, wherein the first hierarchical device certificate combines at least part of a first unique device identifier associated with the first device and a base domain name, the first hierarchical device certificate includes a fully qualified domain name and the first unique device identifier includes at least one of a type/model identifier or an origin/manufacturer of the first device. Each hierarchical portion/level of the first hierarchical device certificate may be compared against one or more certificates issued by one or more certificate issuers to confirm whether the first hierarchical device certificate is within the scope of identifiers authorized by the certificate issuers. The transaction may be accepted if the first hierarchical device certificate is within the scope of identifiers authorized by the certificate issuers. The at least part of the first unique device identifier may be segmented into sub-domains that define a restricted domain in which the first device is permitted to operate.

In one example, the first unique device identifier may include an identifier of a Global System for Mobile communication Association (GSMA) approved group that allocates a type allocation code. In another example, the first unique device identifier may include an IEEE 64-bit Extended Unique Identifier.

Another aspect provides a certificate validation device comprising a communication circuit and a processing circuit. The processing circuit may be configured to: (a) receive, as part of a transaction, a first hierarchical device certificate from a first device, wherein the first hierarchical device certificate combines at least part of a first unique device identifier associated with the first device and a base domain name, the first hierarchical device certificate includes a fully qualified domain name and the first unique device identifier includes at least one of a type/model identifier or an origin/manufacturer of the first device; (b) compare each hierarchical portion/level of the first hierarchical device certificate against one or more certificates issued by one or more certificate issuers to confirm whether the first hierarchical device certificate is within the scope of identifiers authorized by the certificate issuers; and/or (c) accept the transaction if the first hierarchical device certificate is within the scope of identifiers authorized by the certificate issuers.

DETAILED DESCRIPTION

Figure 1:
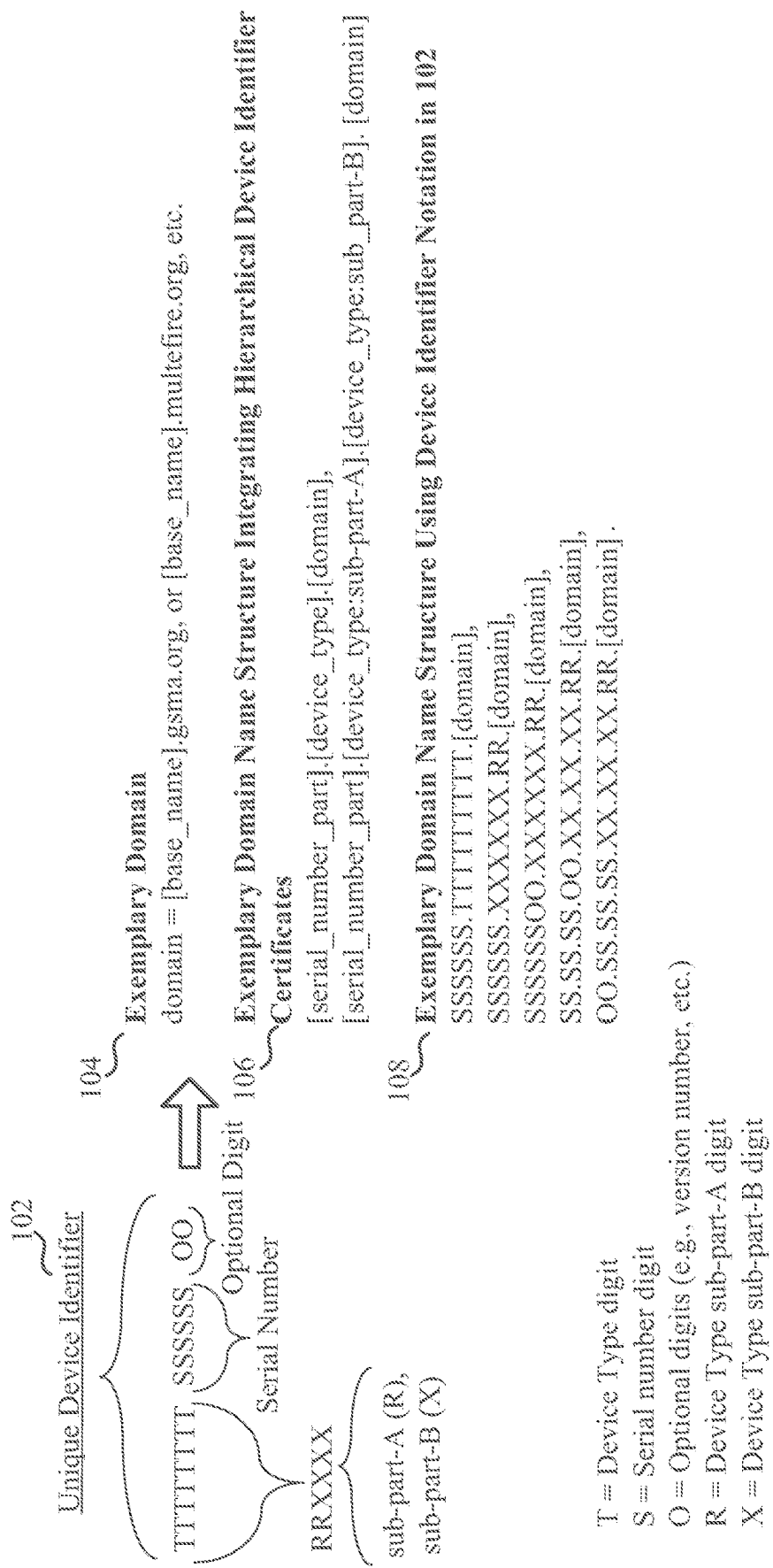
FIG. 1 illustrates an exemplary domain name structure for representing HGUIDs.

In the following description, specific details are given to provide a thorough understanding of the described implementations. However, it will be understood by one of ordinary skill in the art that the implementations may be practiced without these specific details. For example, circuits may be shown in block diagrams in order not to obscure the implementations in unnecessary detail. In other instances, well-known circuits, structures and techniques may be shown in detail in order not to obscure the implementations.

The word "exemplary" is used herein to mean "serving as an example, instance, or illustration." Any implementation or embodiment described herein as "exemplary" is not necessarily to be construed as preferred or advantageous over other embodiments. Likewise, the term "embodiments" does not require that all embodiments include the discussed feature, advantage or mode of operation. The term "device", is meant to be interpreted broadly, and may include (but is not limited to) a mobile phone, pager, wireless modem, personal digital assistant, personal information manager (PIM), palmtop computer, laptop computer, network router, network server, access point node, digital tablet, a smart phone, a chip, and/or other mobile communication/computing devices. Also, the terms "hierarchical device certificate", "hierarchical globally unique device identifier certificate", and "device identifier hierarchical structure" may be interchangeably used herein to refer to a certificate or identifier that integrates a globally unique (device) identifier as part of a fully qualified domain name.

Overview

One aspect provides for generating, delegating, and/or authenticating hierarchical globally unique identifier (HGUID) certificates that are arranged in domain-name form so as to permit delegation and authentication as a Fully Qualified Domain Name (FQDN).

One example provides for including the IMEI as part of a certificate is to encode the IMEI as a Fully Qualified Domain Name (FQDN) within a domain dedicated for IMEIs. For example, the FQDN may be ".imei.gsma.org", which denotes the IMEI of the device associated with the certificate. This FQDN could be included in either the "subject" field or "subjectAltName" extension field. An advantage of this solution is that most (if not all) certificate validation software is able to validate such an FQDN.

The content of the IMEI is mapped to portions of the FQDN so as to permit a validator to parse and evaluate the authenticity of the information conveyed by the IMEI.

Another example provides for using a EUI-64 identifier instead of an IMEI identifier.

According to some aspects, the hierarchical globally unique identifier (HGUID) certificate may be part of (e.g., included within, appended to, integrated within) a digitally/cryptographically signed certificate (e.g., a certificate that may be signed by a private key known only to the signer and verified by other parties using a public key corresponding to the private key). In such instances, the digitally signed certificate may include a digital signature over (at least part) of the hierarchical globally unique identifier (HGUID) certificate, which is signed or generated by the issuer. Additionally, the digitally signed certificate may also include other information, such as, as an expiration date for the hierarchical globally unique identifier (HGUID) certificate, a validity date range for the HGUID certificate, etc.

Exemplary Hierarchical Device Certificate Models

FIG. 1 illustrates an exemplary domain name structure integrating hierarchical device certificates for a device. In this example, a base domain name 104 may be defined, such as ".[base_name].gsma.org" or ".[base_name] multefire.org".

In order to integrate a globally unique identifier (e.g., unique device identifier) as part of a domain, a hierarchical device identifier certificate 106 may be defined that integrates both the domain and the globally unique (device) identifier as a fully qualified domain name. A fully qualified domain name (fqdn or FQDN) includes or consists of a list of domain labels representing a hierarchy from a lowest relevant level in the Domain Name System (DNS) to the top-level domain (TLD). The domain labels may be concatenated using a full stop (dot or period) character as separator between labels. Many DNS resolvers (e.g., software that ascertain a full path for the FQDN) process a domain name that contains a dot or period in any position as being fully qualified. The DNS resolvers typically seek to identify a path identified by the hierarchy of the FQDN.

As illustrated in 106, an exemplary hierarchical domain integrating a device identifier may include a sub-domain followed by a parent or root domain (e.g., gsma.org or multefire.org, etc.). According to various examples, the hierarchical device identifier certificate 106 may integrate the base domain and the globally unique (device) identifier as ".[serial_number_part].[device_type].[domain]", or ".[serial_number_part].[device_type:sub-part-A].[domain]", or ".[device identifier].[domain]".

In one example, a unique device identifier 102 may include a device type TTTTTTTT, a device serial number SSSSSS, and/or possibly other optional digits associated with the device. In some instances, the device type may include a combination of parts RRXXXX (e.g., sub-part-A, sub-part-B, etc.) where each part (e.g., RR, XX) may be used to denote a category (and sub-category) associated with the device (e.g., related to one or more qualities, resources, aspects, and/or operating parameters for this device).

In other instances, the device type may be expanded to hierarchically include sub-parts and only a subset of the sub-parts making up the device type. Examples of hierarchical domain name structures formats integrating a unique device identifier include: "SSSSSS.TTTTTTTT.[domain]", "SSSSSS.XXXXXX.RR.[domain]", "SSSSSS-OO.XXXXXX.RR.[domain]", "SS.SS.SS.OO.XX.XX.XX.RR.[domain]" and "OO.SS.SS.SS.XX.XX.XX.RR.[domain]". Variations on the exemplary domain name structures illustrated are also contemplated.

Figure 2:
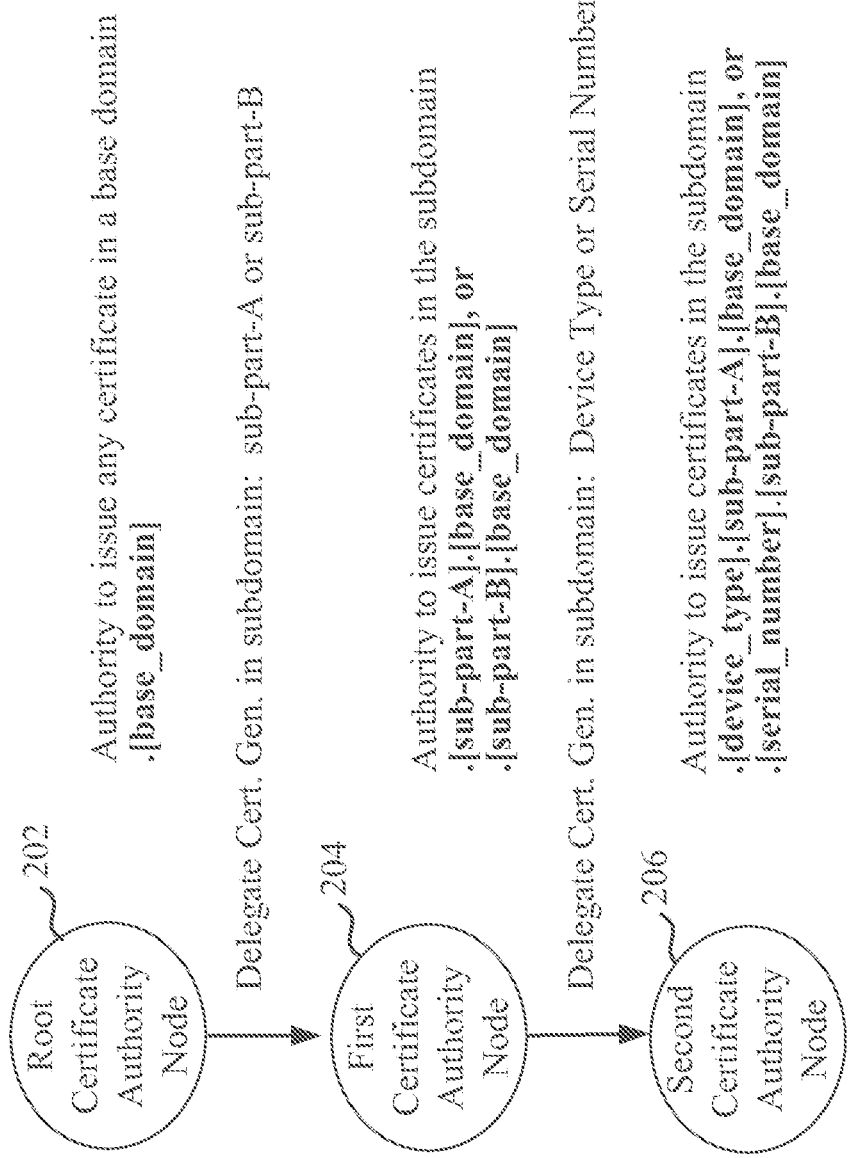
FIG. 2 illustrates generation and delegation of HGUID CA certificates according to one example.

FIG. 2 illustrates generation and delegation of hierarchical device certificates according to one example. A Root Certificate Authority (CA) Node 202 may have the authority to generate any certificate within the domain ".[domain]". The Root CA node 202 may "delegate" first CA node 204 to be able to generate certificates within the subdomains sub-part-A or sub-part-B of the domain ".[domain]". Consequently, the first CA node 204 may be able to generate certificates within the subdomains ".[sub-part-A].[domain]" or ".[sub-part-B].[domain]".

Similarly, the first CA node 204 may constrain the scope of authority of a second CA node 206 by issuing a certificate to the second CA node 206 which includes domain name constraints of the above forms. Consequently, the second CA node 206 may be, for example, able to generate certificates only within the restricted/limited subdomains ".[device_type].[sub-part-A].[domain]", or ".[Serial_number_S-V_part].[sub-part-B].[domain]".

In order to validate the device certificates, the authority of each node to generate a certificate may be propagated to validating authorities. For instance, an entity or validating node may validate a device certificate by validating each certificate in the chain, starting at the Root CA configuration and proceeding to the device certificate. The name constraints in the Root CA certificate are validated against the name constraints in the Root CA configuration, ensuring that the authority of the Root CA certificate does not exceed the scope of domain(s) for which it was configured. For each subsequent intermediate CA certificates (if any), the name constraints of the intermediate certificate are validated against the name constraints of its CA certificate of the intermediate CA certificate issuer, ensuring that the authority of the intermediate certificate does not exceed the scope of sub-domains of the intermediate CA certificate issuer. The device certificate is validated against the CA certificate of the device certificate issuer ensuring that the sub-domains of the device certificate does not exceed the scope of sub-domains of the device certificate issuer. If all certificates pass validation, then the entity may reconstruct the device identifier from the device certificate(s) in the domain structure.

Figure 3:
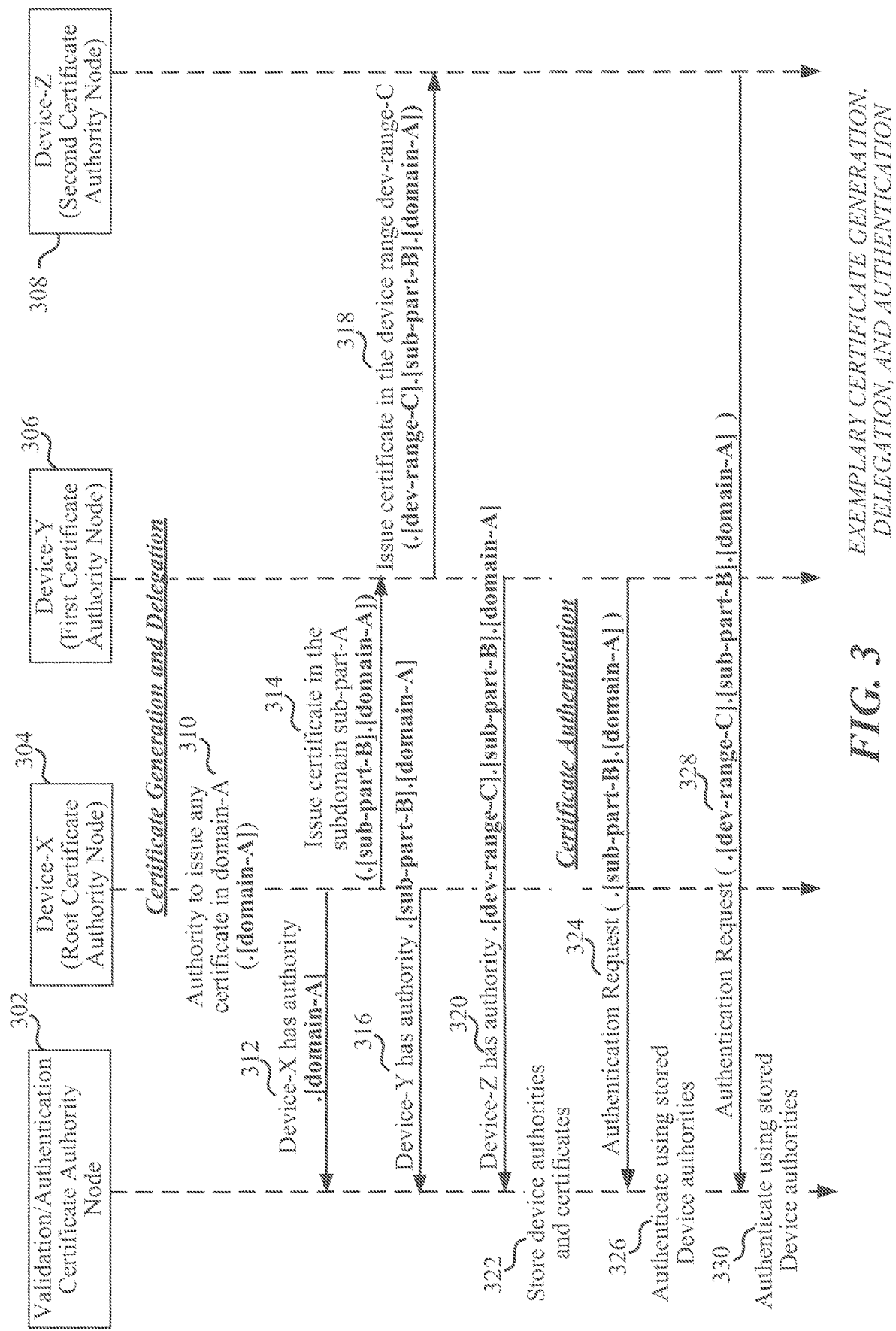
FIG. 3 illustrates an exemplary process by which HGUID CA certificates are generated, delegated, and validated.

FIG. 3 illustrates an exemplary process by which hierarchical device certificates are generated, delegated, and validated. A first device Device-X 304 may be able to operate as a root certificate authority by issuing certificates with a first domain-A 310. The first Device-X 304 may then provide information about its authority over the first domain-A 312 to a validation/authentication certificate authority 302 (e.g., a device, node, or server) for storage and/or use in subsequent validation/authentications. The first device Device-X 304 may issue a hierarchical certificate 314 to a second device Device-Y 306 to permit the second device Device-Y 306 to perform some operations based on the authority granted/delegated by the first Device-X 304. The hierarchical certificate issued by the first device Device-X 304 may be restricted so that the second device Device-Y 306 is only able to use the hierarchical certificate according to the restrictions. For instance, the first device Device-X 304 may restrict the use of the hierarchical certificate to a sub-domain (sub-part-B) within the first domain-A. In one example, the hierarchical certificate may be sent in the form ".[sub-part-B].[domain-A]", where sub-part-B may denote a sub-domain (e.g., which may be defined using all or part of a unique device identifier for the first device Device-X 304). The hierarchical certificate and authorized device information may also be sent 316 to the validation/authentication certificate authority 302 so that when the second Device-Y 306 subsequently sends an authentication request 324 to the validation/authentication certificate authority 302, the validation/authentication certificate authority 302 is able to parse the hierarchical certificate and validate/authenticate it 322 using the previously stored device authorities and certificates 322.

The second device Device-Y 306 may also issue a hierarchical certificate 318 to a third device Device-Z 308 to permit the third device Device-Z 308 to perform some operations based on the authority granted/delegated by the second Device-Y 306. The hierarchical certificate issued by the second device Device-Y 306 may be restricted so that the third device Device-Z 308 is only able to use the hierarchical certificate according to the restrictions. For instance, within the authority of the second device Device-Y 306 to use the hierarchical certificate within the sub-domain ".[sup-part-B].[domain-A]", the second device Device-Y 306 may restrict the use of the hierarchical certificate to the sub-domain ".[sub-part-B].[domain-A]" or to a more restrictive sub-domain ".[dev-range-C].[sub-part-B].[domain-A]" within the first domain-A. In one example, the hierarchical certificate may be sent 318 in the form ".[dev-range-C].[sub-part-B].[domain-A]", where dev-range-C may denote a sub-domain (e.g., which may be defined using all or part of the unique device identifier for the first device Device-X 304, a range of identifier associated with the first device Device-X 304, or other identifying information for the first device Device-X 304). The hierarchical certificate and authorized device information may also be sent 320 to the validation/authentication certificate authority 302 so that when the third Device-Z 308 subsequently sends an authentication request 328 to the validation/authentication certificate authority 302, the validation/authentication certificate authority 302 is able to parse the hierarchical certificate and validate/authenticate it 330 using the previously stored device authorities and certificates 322.

According to some aspects, each of the hierarchical certificates illustrated in FIG. 3 may be distributed as part of a digitally signed certificate (e.g., a certificate that may be signed by a private key known only to the issuer/signer and verified by other parties using a public key corresponding to the private key). In such instances, the digitally signed certificate may include a digital signature over (at least part) of the hierarchical globally unique identifier (HGUID) certificate, which is signed or generated by the issuer. Additionally, the digitally signed certificate may also include other information, such as, as an expiration date for the hierarchical globally unique identifier (HGUID) certificate, a validity date range for the HGUID certificate, etc. In one example, the digitally signed certificate may be compatible with the X.509 for public key infrastructure (PKI).

For instance, the first Device-X 304 may have an associated public_key-X (PubK-X) and a private_key-X (PrvK-X_, and the second Device-Y 306 may have an associated public_key-Y (PubK-Y) and private_key-Y (PrvK-Y). The first Device-X 304 may generate a first hierarchical certificate that includes .[sub-part-B].[domain-A], and signs it with its private key PrvK-X to obtain a digital signature over the hierarchical certificate sig-PubK-X(.[sub-part-B].[domain-A]). The first hierarchical certificate and digital signature may be forwarded to the second Device-Y 306, which can use the public_key-X (PubK-X) on the signature sig-PubK-X(.[sub-part-B].[domain-A]) to verify that the first hierarchical certificate is authentic. Similarly, the second Device-Y 306 may generate a second hierarchical certificate that includes .[dev-range-C].[sub-part-B].[domain-A], and signs it with its private key PrvK-Y to obtain a digital signature over the hierarchical certificate sig-PubK-Y(.[dev-range-C].[sub-part-B].[domain-A]). The second hierarchical certificate and digital signature may be forwarded to the third Device-Z 308, which can use the public_key-Y (PubK-Y) on the signature sig-PubK-Y([dev-range-C].[sub-part-B].[domain-A]) to verify that the second hierarchical certificate is authentic. In addition to the digital signatures, each device or node may append an expiration date for such certificate(s). The validity of a hierarchical certificate may be verified using the digital signatures that may be sent with the hierarchical certificate (e.g., there is no need for each certificate authority to send a version of the hierarchical certificate to the validation/authentication authority).

Figure 4:
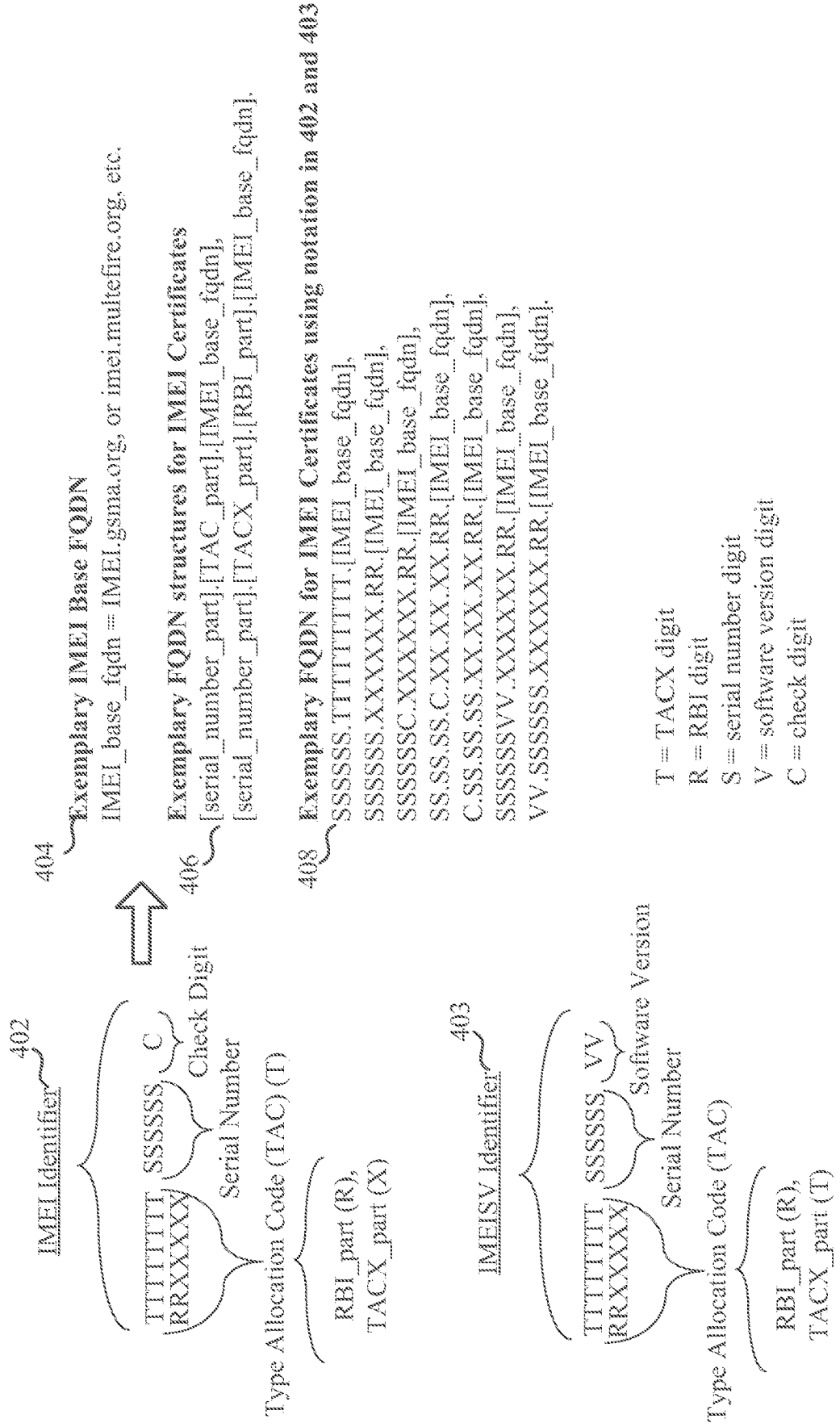
FIG. 4 illustrates an exemplary fully qualified domain name (FQDN) structure integrating hierarchical International Mobile Equipment Identifier (IMEI) certificates for a device.

FIG. 4 illustrates an exemplary fully qualified domain name (FQDN) structure integrating hierarchical International Mobile Equipment Identifier (IMEI) certificates for a device.

As illustrated in 404 of FIG. 4, a base domain [IMEI_base_fqdn] may be in the form "IMEI.gsma.org" or "imei.multefire.org".

In various examples of the FQDN structures integrating an IMEI identifier 406 may be formatted as: ".[IMEI_identifier].IMEI_base_fqdn]" or ".[IMEI_identifier_part(s)].IMEI_base_fqdn]".

In the example illustrated in FIG. 4, a IMEI identifier 402 may include a type allocation code (TAC) TTTTTTTT, a serial number SSSSSS, and a check digit C. Similarly, an IMEI software version IMEISV Identifier 403 may include a TAC, a serial number, and a software version number VV. The TAC may include a RBI part and a TACX part, for example an 8-digit TAC TTTTTTTT may be composed as RRXXXXXX, where R denotes an RBI digit and X denotes a TACX digit.

The IMEI Identifier 402 or IMEISV Identifier 403 may be embedded as part of a device certificate, for example, by mapping portions of the IMEI to a fully qualified domain name (FQDN) structure. Such embedding of at least a portion of the IMEI into a IMEI base FQDN permits subsequent authentication of the certificate. In various examples, the RBI digit(s) or the TACX digits or the TAC digits or the serial number digits may serve to define subdomains to a IMEI base FQDN.

In an RBI-based FQDN, the RBI may serve to define a subdomain containing the IMEI-FQDN issued under authority of that Reporting Body, and in which the TACX further defines a subdomain of that Reporting Body's subdomain. This FQDN mapping allows indicating authority to issue certificates for only a specific set of RBI values and/or TAC values.

In a TAC-based FQDN, the TAC may serve to define a subdomain containing the IMEI-FQDN issued using that TAC. This FQDN allows indicating authority to issue certificates for only a specific set of TAC values, but does not allow indicating authority to issue certificates for only a specific set of RBI values.

As illustrated in 406 of FIG. 4, various examples of the FQDN structures may be formatted as:
RBI-based FQDN: [serial_number_part].[TACX_part].[RBI_part].[IMEI_base_fqdn], or
TAC-based FQDN: [serial_number_part].[TAC_part].[IMEI_base_fqdn],
where [IMEI_base_fqdn] is the agreed FQDN of the domain containing the IMEI and/or IMEISV FQDNs.
A [IMEI_base_fqdn] may be used for both IMEI and IMEISV, or the [IMEI_base_fqdn] for IMEI may be distinct from the [IMEI_base_fqdn] for IMEISV.

The [RBI_part] may be one or more FQDN elements generated from the RBI digits of the TAC. The simplest example is to set [RBI_part] to the decimal representation of the RBI digits. The [TACX_part] may be one or more FQDN elements generated from the TACX digits of the TAC. The simplest example is to set [TACX_part] to the decimal representation of the TACX digits. The [TAC_part] may be one or more FQDN elements generated from the IMEI TAC. The simplest example is to set [TAC_part] to the decimal representation of the TAC. The [serial_number_part] may be one or more FQDN elements generated from the serial number and optionally the check digit (in the case of an IMEI) or the serial version number (in the case of an IMEISV). The simplest example is to set [serial_number_part] to the decimal representation of the IMEI serial number and optionally the check digit (in the case of an IMEI) or the serial version number (in the case of an IMEISV). Another example is to represent the check digit or serial version number in a distinct FQDN element from the one or more FQDN elements representing the serial number. Exemplary FQDN for IMEI certificates 408 are shown using the notation in IMEI 402 and IMEISV 403.

According to one aspect, the scope of authority of a Root CA may be indicated by including FQDN name constraints (see Network Working Group, Request for Comments RFC 5280, section 4.2.1.10) in the Root CA configuration to the validating entity, and including the FQDN name constraints in the Root CA Certificate, where the FQDN name constraints may be either:
(a) ".[IMEI_base_fqdn]" to provide the Root CA with authority to issue any IMEI certificates for any IMEI, or one or a combination of:
(b) ".[RBI_part].[IMEI_base_fqdn]" to provide the Root CA with authority to issue IMEI certificates for any IMEI issued under a particular Reporting Body,
(c) ".[TAC_part].[IMEI_base_fqdn]" or ".[TACX_part].[RBI_part].[IMEI_base_fqn]" to provide the Root CA with authority to issue IMEI certificates for any IMEI containing a specific TAC.

Figure 5:
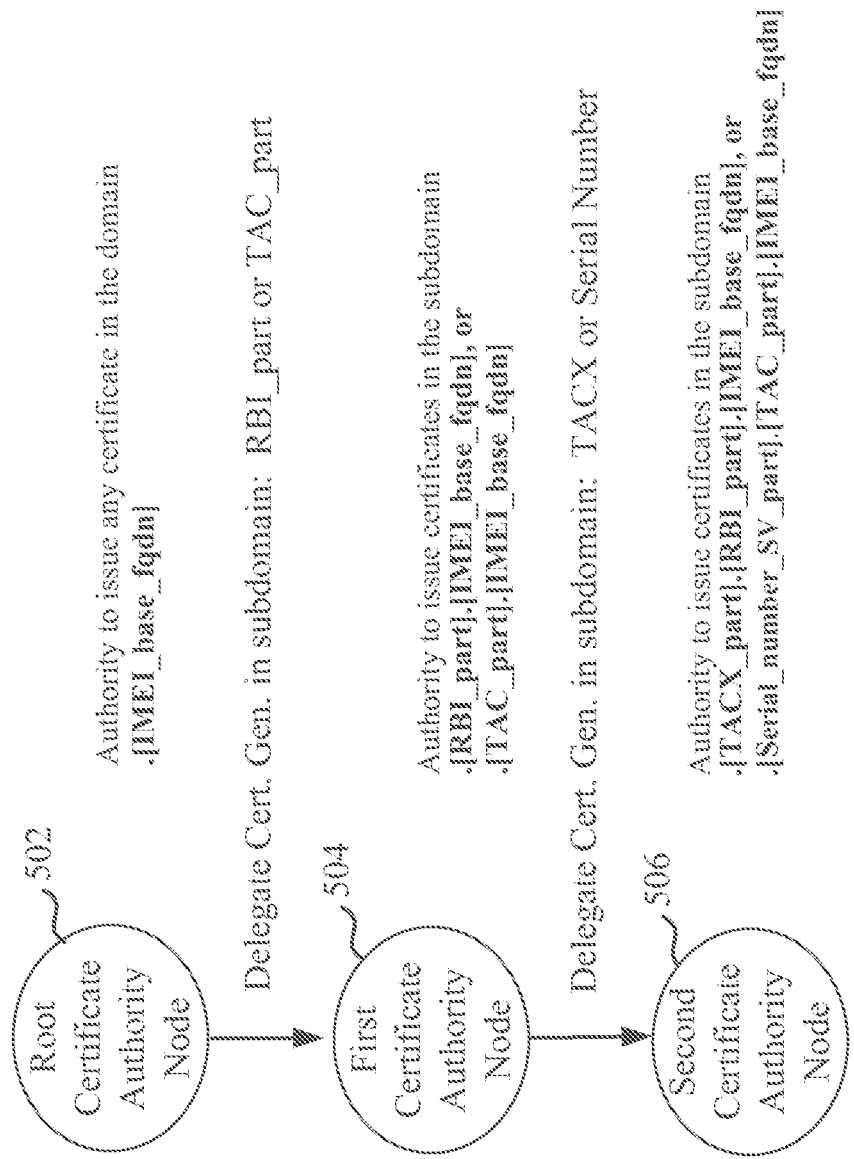
FIG. 5 illustrates generation and delegation of hierarchical IMEI certificates according to one example.

FIG. 5 illustrates generation and delegation of hierarchical IMEI certificates according to one example. A Root CA Node 502 may have the authority to generate any certificate within the domain ".[IMEI_base_fqdn]". The Root CA node 502 may delegate a first CA node 504 to be able to generate certificates within the subdomains RBI_part or TAC_part of the domain ".[IMEI_base_fqdn]". Consequently, the first CA node 504 may be able to generate certificates within the subdomains ".[RBI].[IMEI_base_fqdn]" or ".[TAC].[IMEI_base_fqdn]".

Similarly, the first CA node 504 may constrain the scope of authority of a second CA node 406 by issuing a certificate to the second CA node 506 which includes FQDN name constraints of the above forms. Consequently, the second CA node 506 may be able to generate certificates within the subdomains and restrictions .[TACX_part].[RBI_part].[IMEI_base_fqdn], or .[Serial_number_SV_part].[TAC_part].[IMEI_base_fqdn].

In order to validate the device certificates, the authority of each node to generate a certificate may be propagated to validating authorities. For instance, an entity or validating node may apply RFC 5280 to validate a device certificate, validating each certificate in the chain, starting at the Root CA configuration and proceeding to the device certificate. The name constraints in the Root CA certificate are validated against the name constraints in the Root CA configuration, ensuring that the authority of the Root CA certificate does not exceed the scope of IMEIs for which it was configured. For each subsequent intermediate CA certificates (if any), the name constraints of the intermediate certificate are validated against the name constraints of its CA certificate of the intermediate CA certificate issuer, ensuring that the authority of the intermediate certificate does not exceed the scope of IMEIs of the intermediate CA certificate issuer. The device certificate is validated against the CA certificate of the device certificate issuer ensuring that the IMEI of the device certificate does not exceed the scope of IMEIs of the device certificate issuer. If all certificates pass validation, then the entity reconstructs the IMEI from the FQDN in the device certificate.

Figure 6:
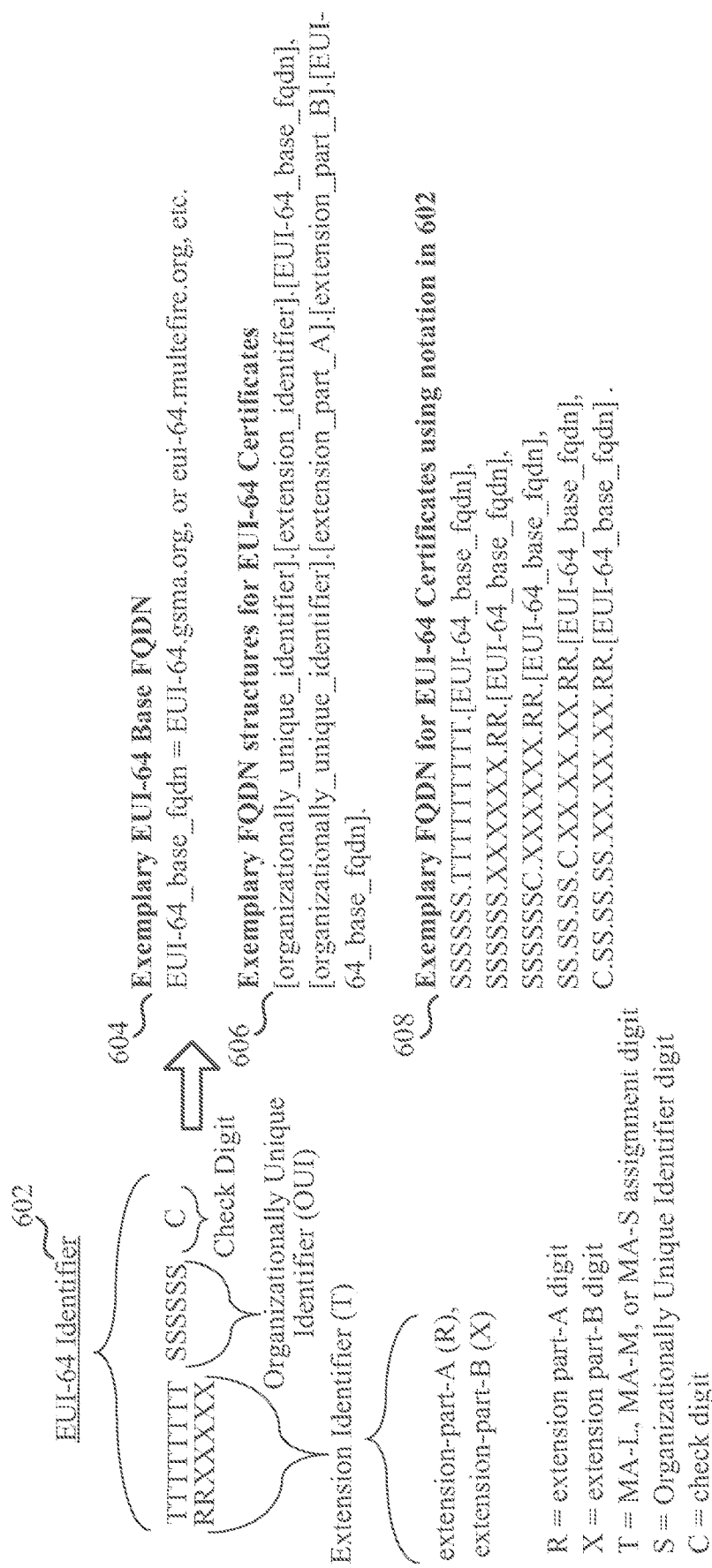
FIG. 6 illustrates another exemplary fully qualified domain name (FQDN) structure integrating hierarchical IEEE 64-bit Extended Unique Identifier (EUI-64) certificates for a device.

FIG. 6 illustrates another exemplary fully qualified domain name (FQDN) structure integrating hierarchical IEEE 64-bit Extended Unique Identifier (EUI-64) certificates for a device.

As illustrated in 606 of FIG. 6, the [EUI-64_base_fqdn] may be in the form "EUI-64.gsma.org" or "eui-64.multefire.org".

In various examples of the FQDN structures integrating an EUI-64 identifier 606 may be formatted as: ".[EUI-64_identifier].[IMEI_base_fqdn]" or ".[EUI-64_identifier_part(s)].[IMEI_base_fqdn]".

In this example, a EUI-64 Identifier 602 may include an Organizationally Unique Identifier (OUI) SSSSSSS, an Extension Identifier TTTTTTTT, and a check digit C. The Extension Identifier may include an extension-part-A and an extension-part-B. In various examples, the Extension Identifier may be 40-bits long (MA-L), 28-bits long (MA-M), or 36-bits long (MA-S).

The EUI-64 Identifier 602 may be embedded as part of a device certificate by mapping portions of the UEI-64 Identifier to a fully qualified domain name structure. Such embedding of at least a portion of the UEI-64 Identifier into a UEI-64 base FQDN permits subsequent authentication of the certificate. In various examples, the extension-part-A digit(s), the extension-part-B digit(s), or the Extension Identifier digits may serve to define subdomains to a UEI-64 base FQDN.

In some implementations, an extension-part of the EUI-64 may be used to define the FQDN, where the Extension Identifier, an extension-part (e.g., extension-part-A, extension-part-B), and/or the OUI value may serve to define a subdomain containing the EUI-64-FQDN issued under authority of that Reporting Body, and in which the extension part further defines a subdomain of that Reporting Body's subdomain. This FQDN mapping allows indicating authority to issue certificates for only a specific set of extension-part values and/or Extension Identifier values.

In an extension-part-based FQDN, the extension-part may serve to define a subdomain containing the EUI-64-FQDN issued under authority of that Reporting Body, and in which other portions of the EUI-64 may further define a subdomain of that Reporting Body's subdomain. This FQDN mapping allows indicating authority to issue certificates for only a specific set of extension-part values.

As illustrated in 606 of FIG. 6, various examples of the FQDN structures may be formatted as:
Extension-identifier-based FQDN): [organizationally_unique_identifier].[extension-identifier].[EUI-64_base_fqdn], or extension-part-based FQDN): [organizationally_unique_identifier].[extension-part].[EUI-64_base_fqdn], where [EUI-64_base_fqdn] is the agreed FQDN of the domain containing the EUI-64 FQDN.
The [extension_part] may be one or more FQDN elements generated from the extension-part digits of the Extension Identifier. One example is to set [extension_part] to the decimal representation of the extension-part digits. The [extension_part] may be one or more FQDN elements generated from the extension-part X digits of the Extension Identifier. One example is to set [extension_part] to the decimal representation of the extension-part digits. The [extension_part] may be one or more FQDN elements generated from the EUI Extension Identifier. The [organizationally_unique_identifier] may be one or more FQDN elements generated from the OUI value and optionally the check digit (C). One example is to set [organizationally_unique_identifier] to the decimal representation of the EUI-64 value number and optionally the check digit (C). Another example is to represent the check digit (C) or OUI value in a distinct FQDN element from the one or more FQDN elements representing the OUI. Exemplary FQDN for EUI-64 certificates 608 are shown using the notation in EUI-64 602.

According to one aspect, the scope of authority of a Root CA may be indicated by including FQDN name constraints (see Network Working Group, Request for Comments RFC 5280, section 4.2.1.10) in the Root CA configuration to the validating entity, and including the FQDN name constraints in the Root CA Certificate, where the FQDN name constraints may be either:

(a) ".[EUI-64_base_fqdn]" to provide the Root CA with authority to issue any EUI-64 certificates for any EUI-64, or one or a combination of:

(b) ".[extension_part].[EUI-64_base_fqdn]" to provide the Root CA with authority to issue EUI-64 certificates for any EUI-64 issued under a particular Reporting Body, (c) ".[extension_part].[EUI-64_base_fqdn]" or ".[extension_ part].[EUI-64_base_fqdn]" to provide the Root CA with authority to issue EUI-64 certificates for any EUI-64 containing a specific Extension Identifier.

Figure 7:
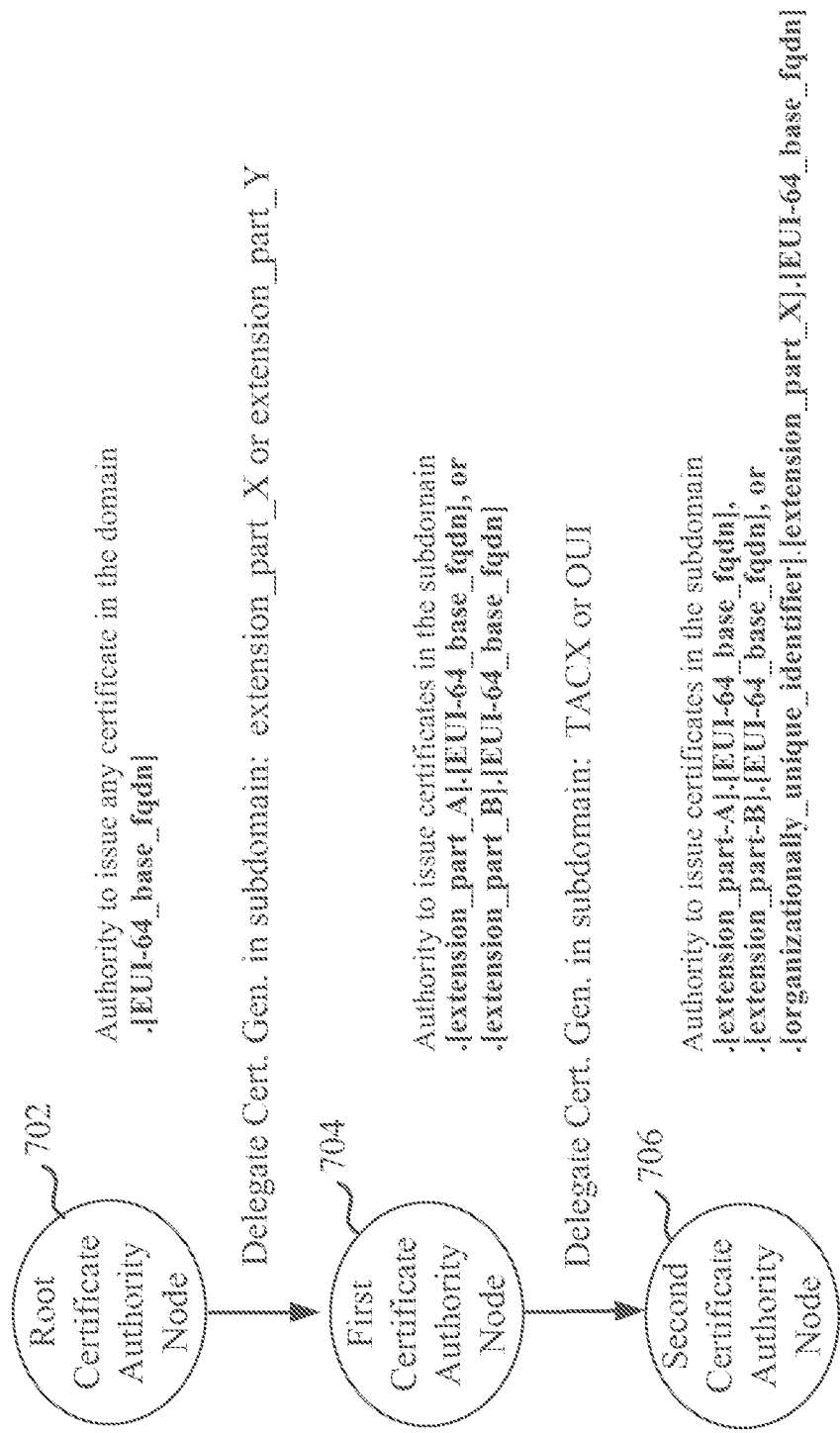
FIG. 7 illustrates generation and delegation of hierarchical EUI-64 certificates according to one example.

FIG. 7 illustrates generation and delegation of hierarchical EUI-64 certificates according to one example. A Root CA Node 702 may have the authority to generate any certificate within the domain ".[EUI-64_base_fqdn]". The Root CA node 702 may delegate a first CA node 704 to be able to generate certificates within the subdomains extension-part-A or extension-part-B of the domain ".[EUI-64_base_fqdn]". Consequently, the first CA node 704 may be able to generate certificates within the subdomains ".[extension-part-A].[EUI-64_base_fqdn]" or "".[extension-part-B].[EUI-64_base_fqdn]".

Similarly, the first CA node 704 may constrain the scope of authority of a second CA node 706 by issuing a certificate to the second CA node 706 which includes FQDN name constraints of the above forms. Consequently, the second CA node 706 may be able to generate certificates within the subdomains and restrictions .[extension_part-A].[EUI-64_base_fqdn], .[extension_part-B].[EUI-64_base_fqdn], or .[organizationally_unique_identifier].[extension_part-A].[EUI-64_base_fqdn].

Figure 8:
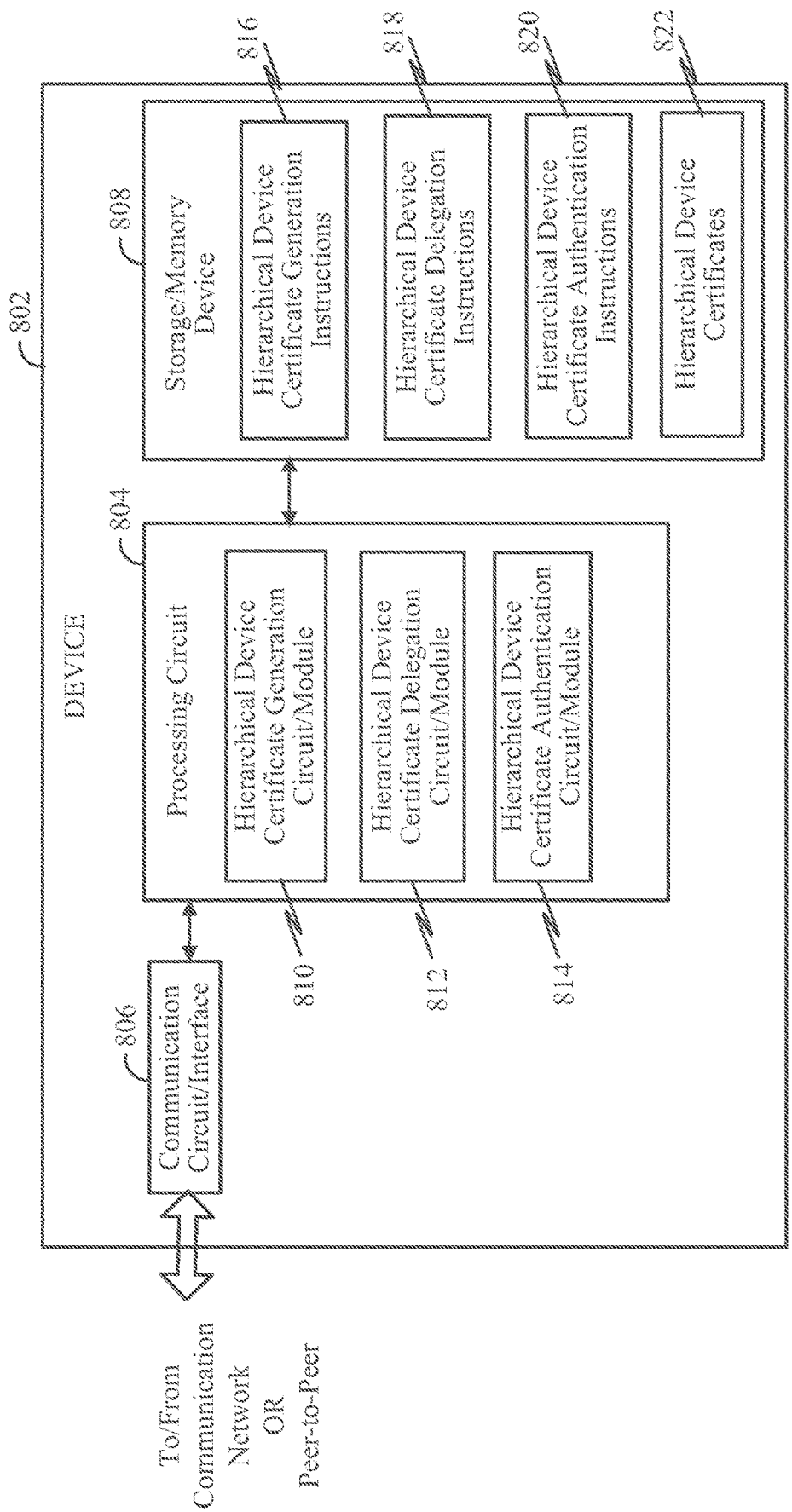
FIG. 8 illustrates a device or node configured to generate, delegate, store and/or authenticate HGUID CA certificates.

Exemplary Device and Methods Operational Therein for Implementing Generation and Delegation of Hierarchical Device Certificates FIG. 8 illustrates a device or node configured to generate, delegate, store and/or authenticate hierarchical device certificates. In various configurations or implementations, the device 802 may operate as a root certificate authority node/device, an intermediate certificate authority node, and/or a certificate authentication node.

The device 802 may include a processing circuit 804 coupled to one or more communication interfaces 806 and/or a storage/memory device 808. The one or more communication interfaces 806 may permit the device 802 to transmit and/or receive information/data/packets, etc., to/from other devices over a communication network and/or a peer-to-peer link.

The processing circuit 804 may include or is configured to perform one or more functions to generate, delegate, and/or authenticate hierarchical device certificates according to one or more aspects described herein. Similarly, the storage/memory device 808 may include hierarchical device certificate generation instructions 816, hierarchical device certificate delegation instructions 818, and hierarchical device certificate authentication instructions 820. Additionally, the storage/memory device 808 may also store hierarchical device certificates or partial device certificates (e.g., restricted device certificates).

Figure 9:
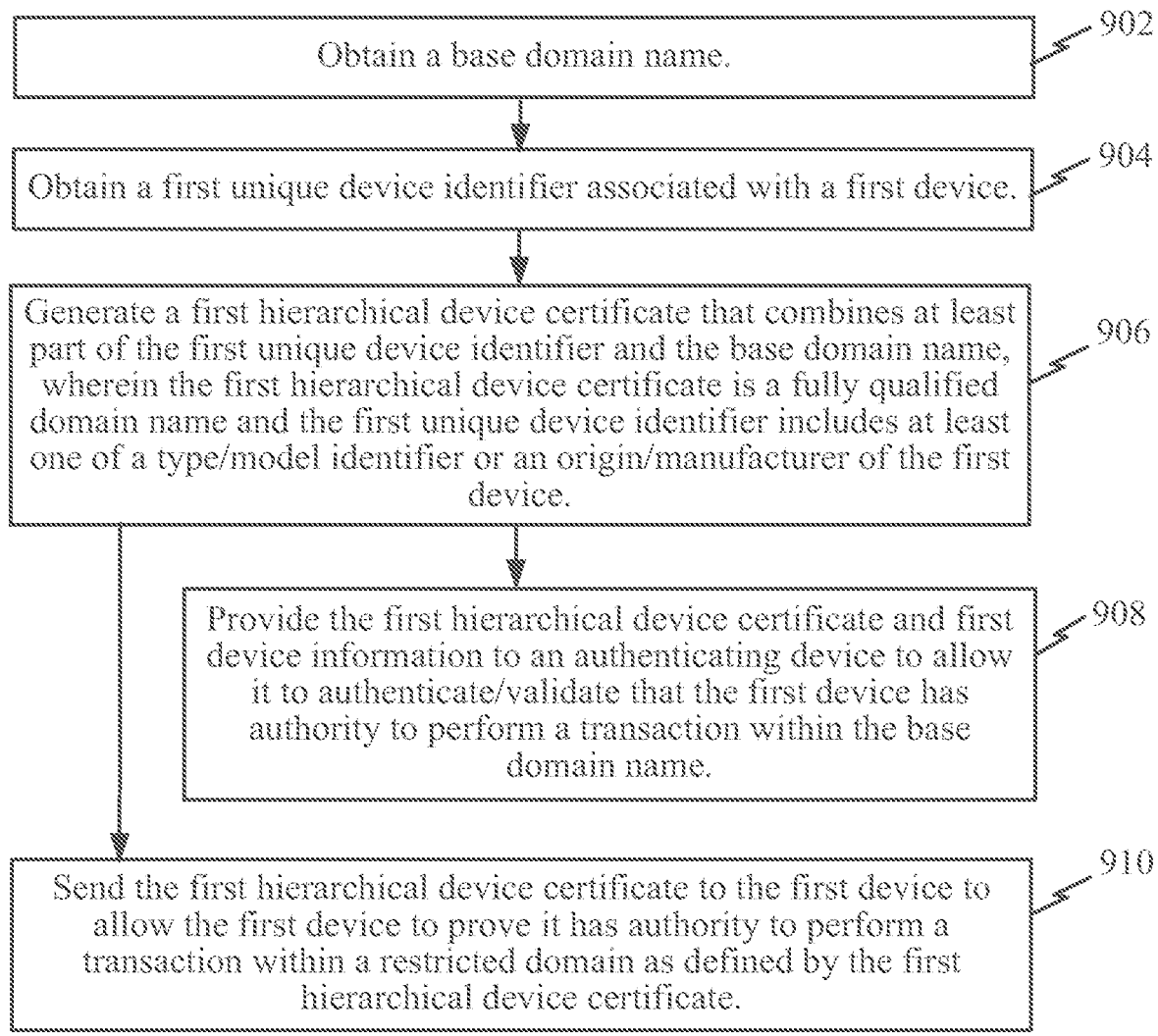
FIG. 9 illustrates a method for generating a HGUID certificate delegating authority to issue a hierarchical device certificate integrating a unique (device) identifier within a fully qualified domain name structure.

FIG. 9 illustrates a method for generating and/or delegating a hierarchical device certificate integrating a unique (device) identifier within a fully qualified domain name structure. In one example, a root certificate authority (e.g., certificate issuer) may perform the method in FIG. 9. A base domain name may be obtained or received 902. The root certificate authority may have the authority to perform transactions within the base domain name. A first unique device identifier associated with a first device may also be obtained 904 by the root certificate authority. The first unique device identifier may include at least one of a type/model identifier or an origin/manufacturer of the first device. A first hierarchical device certificate may then be obtained/generated that combines at least part of the first unique device identifier and the base domain name, wherein the first hierarchical device certificate is a fully qualified domain name 906. The use of at least part of the first unique device identifier may serve as one or more restrictions on how the hierarchical device certificate may be used. In one example, the first unique device identifier may include an identifier of a Global System for Mobile communication Association (GSMA) approved group that allocates the type allocation code.

The first hierarchical device certificate and first device information may be provided, either directly or indirectly, to an authenticating device to allow the authenticating device to authenticate/validate that the first device has authority to perform a transaction within the base domain name 908. In one example, the root certificate authority (e.g., certificate issuer) may send the first hierarchical device certificate to the authenticating device. In another example, the root certificate authority (e.g., certificate issuer) may send the first hierarchical device certificate to the first device, and the first device passes/sends/forwards the first hierarchical device certificate to the authenticating device. In various examples, the "transaction" may include obtaining/reading data, deleting/changing data, and/or access to information. In this manner, the authenticating device may obtain device certificates it can use in subsequent authentication of hierarchical device certificates.

The first hierarchical device certificate may also be sent to the first device to allow the first device to prove it has authority to perform a transaction within a restricted domain as defined by the first hierarchical device certificate 910.

Figure 10:
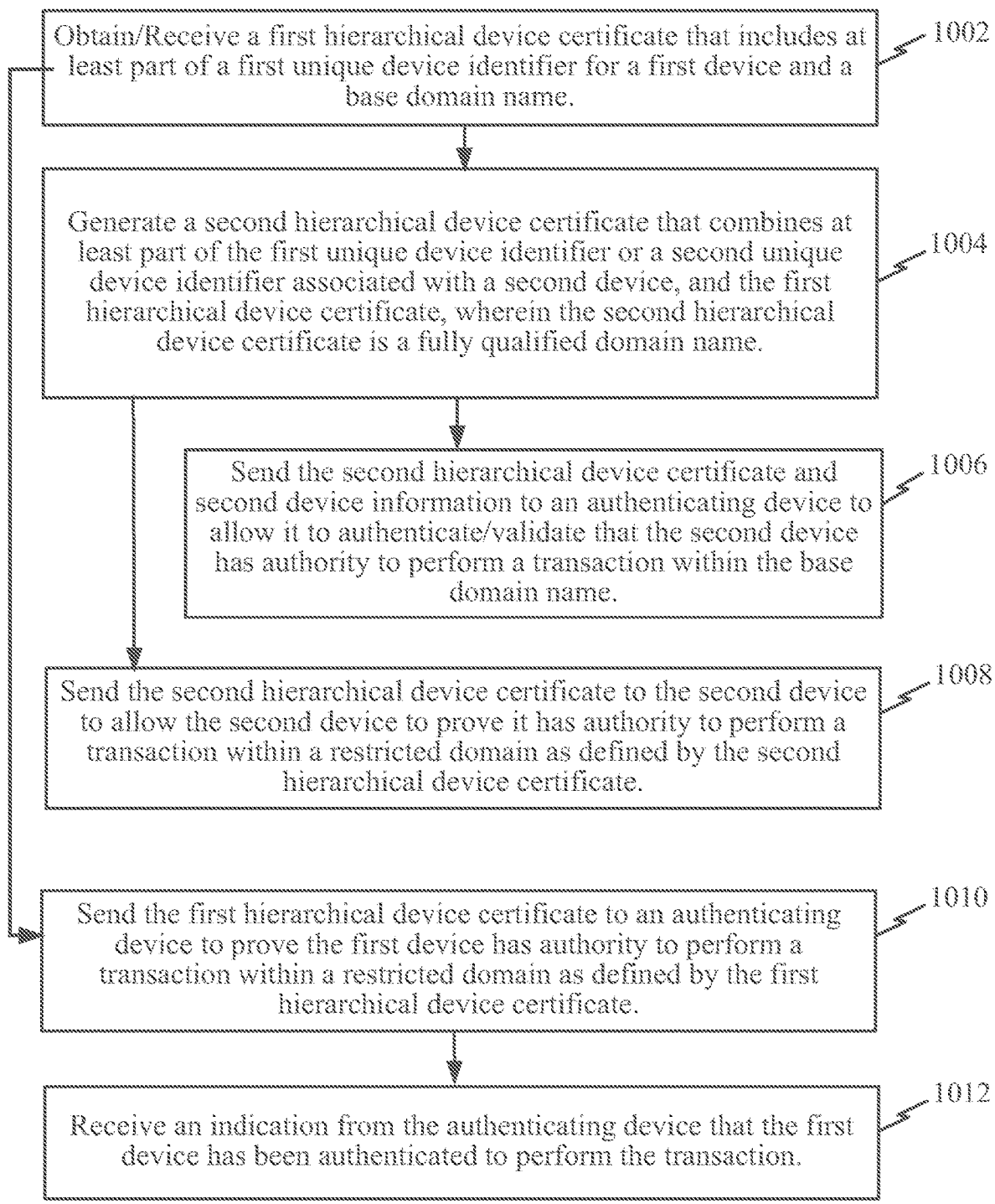
FIG. 10 illustrates another method for generating a HGUID certificate delegating authority to issue a hierarchical device certificate integrating a unique (device) identifier within a fully qualified domain name structure.

FIG. 10 illustrates a method for generating and/or delegating a hierarchical device certificate integrating a unique (device) identifier within a fully qualified domain name structure. In one example, a first device (e.g., first certificate authority node 204, 306, 504, or 704) may perform the method in FIG. 10. A first hierarchical device certificate may be obtained/received that includes at least part of a first unique device identifier for a first device and a base domain name 1002. A second hierarchical device certificate may be generated by the first device that combines at least part of the first unique device identifier or a second unique device identifier associated with a second device, and the first hierarchical device certificate, wherein the second hierarchical device certificate is a fully qualified domain name 1004.

The second hierarchical device certificate and second device information may be sent to an authenticating device (e.g., validation/authentication certificate authority node 302) to allow it to authenticate/validate that the second device has authority to perform a transaction within the base domain name 1006.

The second hierarchical device certificate may be sent to the second device to allow the second device to prove it has authority to perform a transaction within a restricted domain as defined by the second hierarchical device certificate 1008.

In some implementations, the first device may use the first hierarchical device certificate to show (e.g., prove) that it is authorized to perform a transaction (e.g., based on a delegated authority from the issuer of the first hierarchical device certificate). The first hierarchical device certificate may be sent to an authenticating device (e.g., verifier) to prove the first device has authority to perform a transaction within a restricted domain as defined by the first hierarchical device certificate 1010. In response, the first device may receive an indication from the authenticating device that the first device has been authenticated to perform the transaction 1012.

Figure 11:
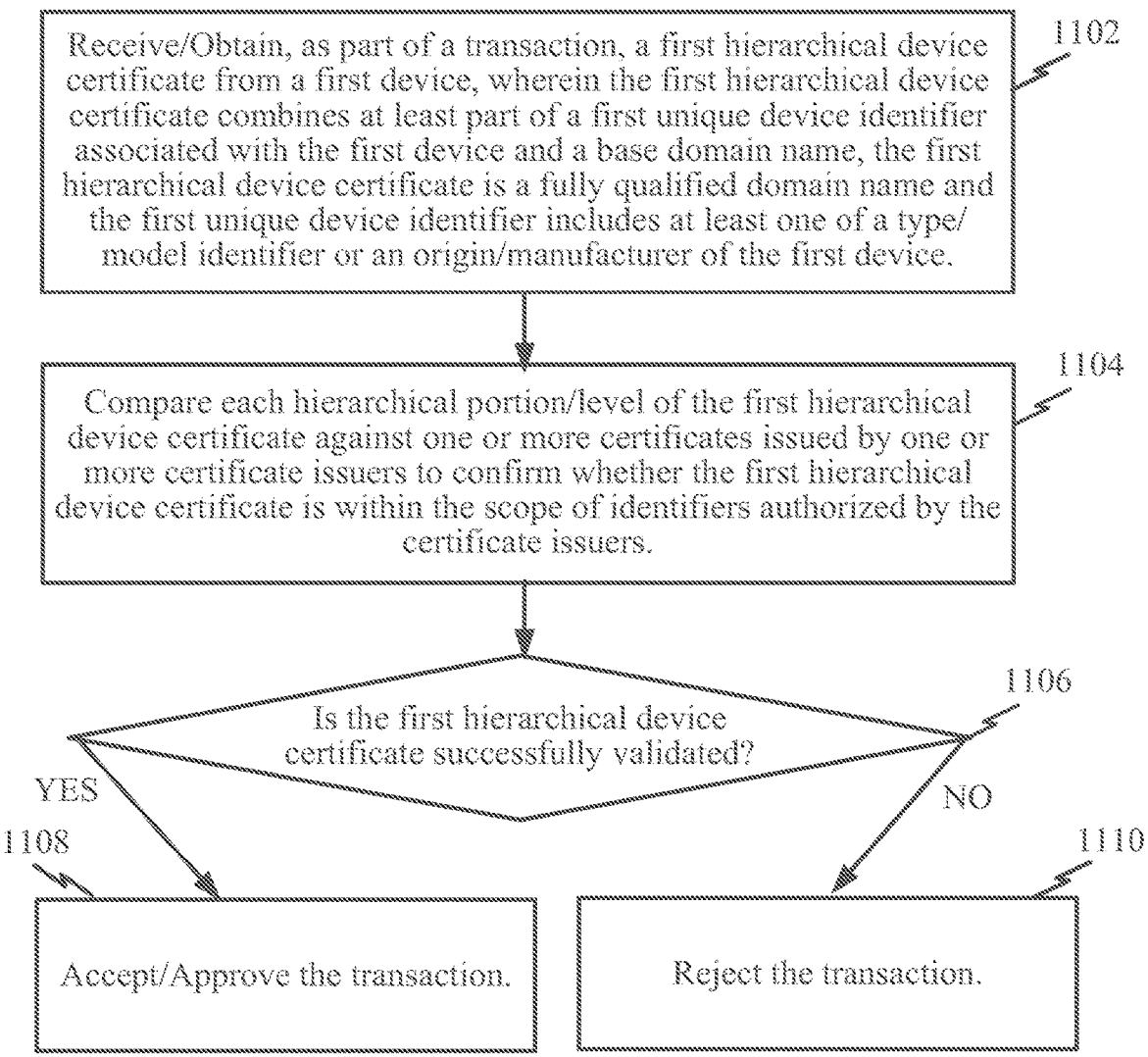
FIG. 11 illustrates a method, operational at a validation/authentication node, for validating a hierarchical globally unique device identifier (HGUID) certificate integrating a unique device identifier.

FIG. 11 illustrates a method, operational at a validation/authentication node, for authenticating a hierarchical device certificate integrating a unique device identifier. As part of a transaction, communication, or operation, the validation/authentication node may receive a first hierarchical device certificate from a first device, wherein the first hierarchical device certificate combines at least part of a first unique device identifier associated with the first device and a base domain name, the first hierarchical device certificate is a fully qualified domain name and the first unique device identifier includes at least one of a type/model identifier or an origin/manufacturer of the first device 1102. Note that, in order to properly authenticate the first hierarchical device certificate, the validation/authentication node may also receive or obtain a chain of intermediate certificates back to a root certificate authority certificate. This allows the validation/authentication node to confirm/verify the first device's authority at each portion/level of the hierarchy.

Each portion/level (e.g., sub-domain) of the first hierarchical device certificate may be compared (recursively) against one or more certificates issued by one or more certificate issuers to confirm whether the first hierarchical device certificate is within the scope of identifiers authorized by the certificate issuers 1104. That is, for each level of the hierarchy (e.g., sub-domain), the validation/authentication node may check a certificate issued by a certificate issuer corresponding to that level of the hierarchy to ascertain whether the first device in fact has the authority to perform the transaction. Consequently, the validation/authentication node may recursively perform validation of additional portions of the first hierarchical device certificate with a plurality of other certificate authority issuers.

If all portions of the first hierarchical device certificate are successfully validated 1106, the validation/authentication node accepts/approves the transaction 1108 and/or sends a response to the first device. Otherwise, the transaction is rejected 1110.

One or more of the components, steps, features and/or functions illustrated in the Figures may be rearranged and/or combined into a single component, step, feature or function or embodied in several components, steps, or functions. Additional elements, components, steps, and/or functions may also be added without departing from the invention. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational at a first device, comprising:
   obtaining a first hierarchical device certificate that includes a first name arranged in domain name format, the first name combining, as domain labels, at least part of a first unique device identifier for a first device, at least one of a type/model identifier or an origin/manufacturer of the first device, and a base domain name, the combining using a full stop character as a separator between the domain labels, wherein the first name is a fully qualified domain name enabling authentication of the first hierarchical device certificate across various authenticating devices configured to verify a transaction corresponding to a hierarchical level of a domain label within the domain labels of the first name;
   sending the first hierarchical device certificate to an authenticating device to prove the first device has authority to perform a transaction within a restricted domain as defined by the first hierarchical device certificate; and
   receiving an indication from the authenticating device that the first device has been authenticated to perform the transaction.

2. The method of claim 1, wherein the at least part of the first unique device identifier is segmented into sub-domains that define the restricted domain in which the first device is permitted to operate.

3. The method of claim 1, wherein the first unique device identifier includes an identifier of a Global System for Mobile communication Association (GSMA) approved group that allocates a type allocation code.

4. The method of claim 1, wherein the first unique device identifier includes an IEEE 64-bit Extended Unique Identifier.

5. The method of claim 1, further comprising:
   generating a second hierarchical device certificate that includes a second name combining at least part of the first unique device identifier or a second unique device identifier associated with a second device, and the first name, wherein the second name is a fully qualified domain name; and
   sending the second hierarchical device certificate and second device information to the second device to allow it to prove it has authority to perform a transaction within a restricted domain as defined by the second hierarchical device certificate.

6. The method of claim 5, further comprising:
   sending the second hierarchical device certificate and second device information to an authenticating device to allow it to authenticate/validate that the second device has authority to perform a transaction within the base domain name.

7. The method of claim 1, further comprising:
   digitally signing the first hierarchical device certificate using a private key known only to the first device to obtain a first digital signature; and
   sending the first digital signature to the authenticating device, where the validity of the first hierarchical device certificate is confirmed using a public key, corresponding to the private key, over the first digital signature.

8. A first device, comprising:

a communication circuit; and a processing circuit coupled to the communication circuit, the processing circuit configured to:
- obtain a first hierarchical device certificate that includes a first name arranged in domain name format, the first name combining, as domain labels, at least part of a first unique device identifier for a first device, at least one of a type/model identifier or an origin/manufacturer of the first device, and a base domain name, the combining using a full stop character as a separator between the domain labels, wherein the first name is a fully qualified domain name enabling authentication of the first hierarchical device certificate across various authenticating devices configured to verify a transaction corresponding to a hierarchical level of a domain label within the domain labels of the first name;
- send the first hierarchical device certificate to an authenticating device to prove the first device has authority to perform a transaction within a restricted domain as defined by the first hierarchical device certificate; and
- receive an indication from the authenticating device that the first device has been authenticated to perform the transaction.

9. The first device of claim 8, wherein the processing circuit is further configured to:
- generate a second hierarchical device certificate that includes a second name arranged in domain name format that combines at least part of the first unique device identifier or a second unique device identifier associated with a second device, and the first name, wherein the second name is a fully qualified domain name; and
- send the second hierarchical device certificate and second device information to the second device to allow it to prove it has authority to perform a to perform a transaction within a restricted domain as defined by the second hierarchical device certificate.

10. The first device of claim 9, wherein the processing circuit is further configured to:
- send the second hierarchical device certificate and second device information to an authenticating device to allow it to authenticate/validate that the second device has authority to perform a transaction within the base domain name.

11. A method for validating device certificates at a node, comprising:
- receiving, as part of a transaction, a first hierarchical device certificate from a first device, wherein the first hierarchical device certificate includes a first name that combines, as domain labels, at least part of a first unique device identifier associated with the first device, at least one of a type/model identifier or an origin/manufacturer of the first device, and a base domain name, the first name using a full stop character as a separator between the domain labels, the first name is a fully qualified domain name enabling authentication of the first hierarchical device certificate across various authenticating devices configured to verify a transaction corresponding to a hierarchical level of a domain label within the domain labels of the first name;
- comparing each hierarchical portion/level of the first name against one or more certificates issued by one or more certificate issuers to confirm whether the first name is within a scope of identifiers authorized by the certificate issuers; and
- accepting the transaction if the first name is within the scope of identifiers authorized by the certificate issuers.

12. The method of claim 11, wherein the at least part of the first unique device identifier is segmented into sub-domains that define a restricted domain in which the first device is permitted to operate.

13. The method of claim 11, wherein the first unique device identifier includes an identifier of a Global System for Mobile communication Association (GSMA) approved group that allocates a type allocation code.

14. The method of claim 11, wherein the first unique device identifier includes an IEEE 64-bit Extended Unique Identifier.

15. A certificate validation device, comprising:

a communication circuit; and a processing circuit coupled to the communication circuit, the processing circuit configured to:
- receive, as part of a transaction, a first hierarchical device certificate from a first device, wherein the first hierarchical device certificate includes a first name that combines, as domain labels, at least part of a first unique device identifier associated with the first device, at least one of a type/model identifier or an origin/manufacturer of the first device, and a base domain name, the first name using a full stop character as a separator between the domain labels, the first name is a fully qualified domain name enabling authentication of the first hierarchical device certificate across various authenticating devices configured to verify a transaction corresponding to a hierarchical level of a domain label within the domain labels of the first name;
- compare each hierarchical portion/level of the first name against one or more certificates issued by one or more certificate issuers to confirm whether the first name is within a scope of identifiers authorized by the certificate issuers; and
- accept the transaction if the first name is within the scope of identifiers authorized by the certificate issuers.

16. The certificate validation device of claim 15, wherein the at least part of the first unique device identifier is segmented into sub-domains that define a restricted domain in which the first device is permitted to operate.

17. The certificate validation device of claim 15, wherein the first unique device identifier includes an identifier of a Global System for Mobile communication Association (GSMA) approved group that allocates a type allocation code.

18. The certificate validation device of claim 15, wherein the first unique device identifier includes an IEEE 64-bit Extended Unique Identifier.

* * * * *